United States Patent

Habermann et al.

[11] 4,308,490
[45] Dec. 29, 1981

[54] DEVICE FOR COMPENSATING THE GAIN OF A SERVO-CONTROLLED CIRCUIT BY NEGATIVE CURRENT FEEDBACK

[75] Inventors: Helmut Habermann; Maurice Brunet, both of Vernon, France

[73] Assignee: Societe Europeenne de Propulsion, Puteaux, France

[21] Appl. No.: 12,333

[22] Filed: Feb. 15, 1979

[30] Foreign Application Priority Data

Feb. 20, 1978 [FR] France ............................... 78 04769

[51] Int. Cl.³ .......................................... G05D 23/275
[52] U.S. Cl. ...................................... 318/632; 308/10
[58] Field of Search ..................... 318/632, 629, 615; 308/10

[56] References Cited

U.S. PATENT DOCUMENTS

| | | | |
|---|---|---|---|
| 3,100,546 | 8/1963 | Cramwinckel | 318/632 XP |
| 4,037,147 | 7/1977 | Smith | 318/632 |
| 4,157,536 | 6/1979 | Gauthier | 318/632 XP |
| 4,157,538 | 6/1979 | Simon et al. | 318/632 XP |

Primary Examiner—B. Dobeck
Attorney, Agent, or Firm—DeLio and Montgomery

[57] ABSTRACT

The invention relates to a device for compensating the gain of a circuit servo-controlling the position of a rotor with the aid of at least one electromagnetic bearing provided with electromagnet windings, from signals delivered by at least one detector detecting the position of the rotor, the servo-control circuit ensuring the control of the supply of the windings in response to the signals delivered by the detectors and comprising an amplification circuit with which is associated a negative current feedback loop, said device further comprising supplementary electrical means for injecting at the input of the amplification circuit a signal depending on the variations in the airgap of the servo-controlled electromagnetic bearing, in a predetermined variation frequency zone. The invention is more particularly applicable to electronic circuits for controlling active electromagnetic bearings.

6 Claims, 4 Drawing Figures

DEVICE FOR COMPENSATING THE GAIN OF A SERVO-CONTROLLED CIRCUIT BY NEGATIVE CURRENT FEEDBACK

The present invention relates to a device for compensating the gain of a circuit for servo-controlling the position of a rotor with the aid of at least one electromagnetic bearing provided with electromagnet windings, from signals delivered by at least one detector detecting the position of the rotor, the servo-control circuit ensuring the control of the supply of the windings in response to the signals delivered by the detectors and comprising an amplifiction circuit with which is associated a negative current feedback loop.

For controlling the supply of the excitation windings of an electromagnetic bearing, a servo-control circuit is conventionally used, comprising an amplification circuit with which is associated a negative current feedback loop. Such a type of circuit is shown in FIG. 1.

The control voltage $U_c$, obtained from the signals xd issuing from the detectors detecting the position of the rotor (not shown), in conventional manner (cf. for example French Pat. No. 2 149 644), with the aid of servo-control circuits 7 comprising corrector circuits such as phase advance networks, is applied, via a linearizator circuit 4, to an amplification circuit 1 of which the output is connected to a winding 3 of a magnetic bearing electromagnet. A negative current feedback loop 2 is associated with the amplifier 1. The loop 2 comprises a current measuring element 21 which may for example be an amperemetric measuring clip or a resistor. The signal issuing from the current measuring element 21 is reinjected at the input of the amplifier 1.

The drawback of such a device lies in the fact that the negative feedback of the loop 2 is vitiated by all the defects of the airgap of the servo-controlled electromagnetic bearing, as it takes into account only the current circulating in the winding 3. Thus, the gain of the looped amplifier 1, 2 varies as a function of the airgap of the servo-controlled electromagnetic bearing and consequently the force of actuation exerted by the electromagnets, i.e. the stiffness of the servo-controlled bearing varies as a function of the value of the airgap of the bearing.

It is precisely an object of the present invention to remedy the above-mentioned drawbacks and to reduce the variations of the stiffness of the servo-controlled bearing.

These aims are attained due to a device of the type mentioned at the beginning of the specification, in which, according to the invention, supplementary electrical means are incorporated for injecting at the input of the amplification circuit a signal dependent on the variations of the airgap of the servo-controlled electromagnetic bearing, in a predetermined variation frequency zone.

According to a first embodiment of the invention, said supplementary electrical means comprise an auxiliary coil with a reduced number of turns disposed in the vicinity of the electromagnet windings of the electromagnetic bearing to deliver a signal proportional to the variation of the flux in the airgap of the electromagnetic bearing, and an auxiliary integrator circuit to which is applied the signal issuing from the auxiliary coil, the output of the integrator circuit being connected to the input of the amplification circuit of the servo-control circuit, and the negative current feedback loop comprises a second auxiliary integrator circuit.

In this case, the pass band and the gain of the second auxiliary integrator circuit are preferably respectively equal to the pass band and to the gain of the first auxiliary integrator circuit. The time constants of the first and second auxiliary integrator circuits are greater than the time constant of the main servo-control circuit.

According to a second embodiment of the invention, said supplementary electrical means comprise an adder circuit with two inputs to which are applied on the one hand a signal obtained from said detectors and representing the variations in the position of the rotor and on the other hand a signal corresponding to the mean position of the rotor, and a multiplier circuit mounted upstream of the amplification circuit provided with its negative current feedback loop, to effect the product of the control signal of the non-corrected amplification circuit, and of the signal issuing from said adder circuit.

Thus, by using a conventional servo-control device, with negative current feedback loop, and magnetic bearing actuation elements of usual quality, the present invention makes it possible, by carrying out correcting means which are easy to produce, to increase the precision of the servo-control system.

The present invention, due to the use of auxiliary electrical means cooperating with a conventional negative current feedback loop, makes it possible, in particular, to obtain a form of actuation which is almost directly proportional to the control voltage without requiring the use of a Hall effect detector. In fact, although the insertion of a Hall effect probe in the airgap of the magnetic bearing electromagnets makes it possible to dispose of a negative feedback signal ensuring a perfect proportionality between the force of actuation of the bearing and the control voltage $U_c$, this insertion raises considerable difficulties from the practical point of view and leads to a very fragile system. Thus, the means recommended within the scope of the present invention make it possible, by using auxiliary electrical means outside the airgap of the electromagnets and by acting in combination with a conventional negative current feedback loop, to overcome the variations in stiffness of a magnetic bearing due to the variations of the airgap of said bearing.

The invention will be more readily understood on reading the following description with reference to the accompanying drawings, in which.

Figure 1:
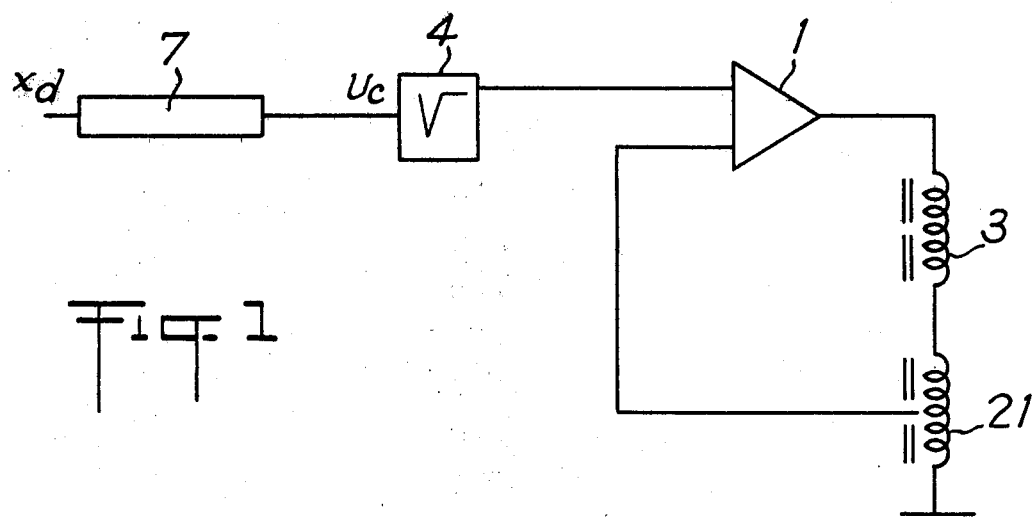
FIG. 1 is a view of a conventional servo-control circuit with negative current feedback loop, for the servo-control of a magnetic bearing.
Figure 2:
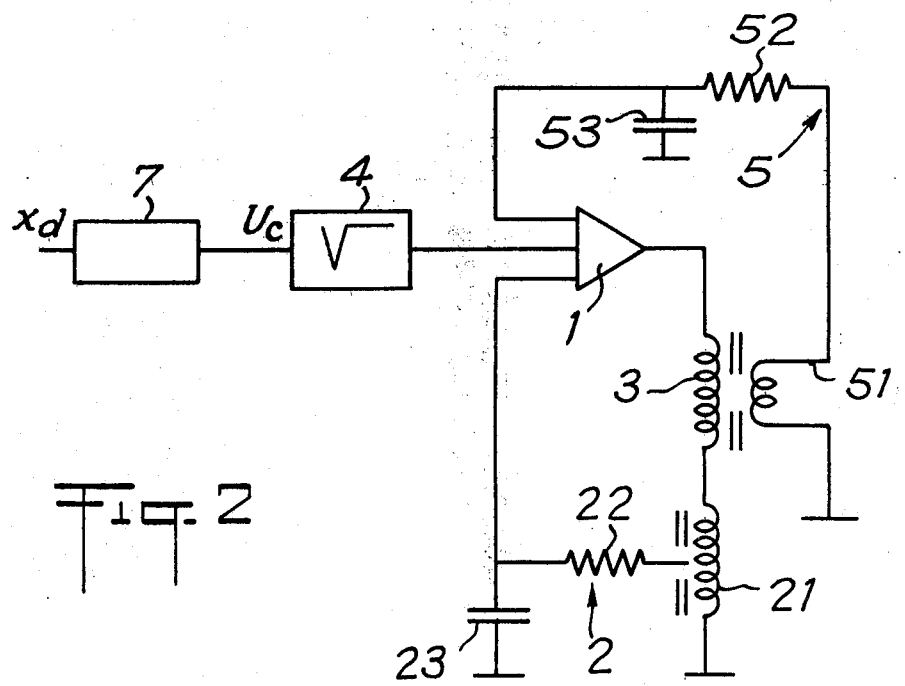
FIG. 2 is a view of a servo-control circuit comprising a gain compensation device according to a first embodiment of the invention.

FIG. 2 shows the diagram of a servo-control circuit in which, apart from the conventional elements of the diagram of FIG. 1, are further incorporated supplementary electrical means 5 intended for effecting, for a given frequency band, a compensation of the gain of the amplifier 1, which takes into account the variations of the airgap of the servo-controlled bearing. The assembly 5 comprises a small coil 51 composed of a few detection turns disposed around the winding 3, so as to detect the variations of magnetic flux in the airgap of the servo-controlled bearing. The coil 51 is itself connected to an integrator circuit 52, 53 composed of a resistor 52 and a capacitor 53. The integrator circuit 52, 53 is itself connected to the input of the amplifier 1 to reinject a signal proportional to the magnetic flux in the airgap of the bearing, therefore, in particular, to the actual value of the airgap of the servo-controlled bearing.

Furthermore, a corrector network or RC low pass filter itself comprising a resistor 22 and a capacitor 23 is interposed in the negative current feedback loop 2 to compensate the presence of the corrector network 52, 53 in the loop 5. The gain and the pass band of the RC circuit 52, 53 are respectively equal to the gain and to the pass band of the RC circuit 22, 23. Furthermore, the time constants of each of the circuits 52, 53 and 22, 23 are equal to or greater than (for example in a ratio of about 1 to 5) the time constant of the main servo-control loop of the circuit 7.

Figure 3:
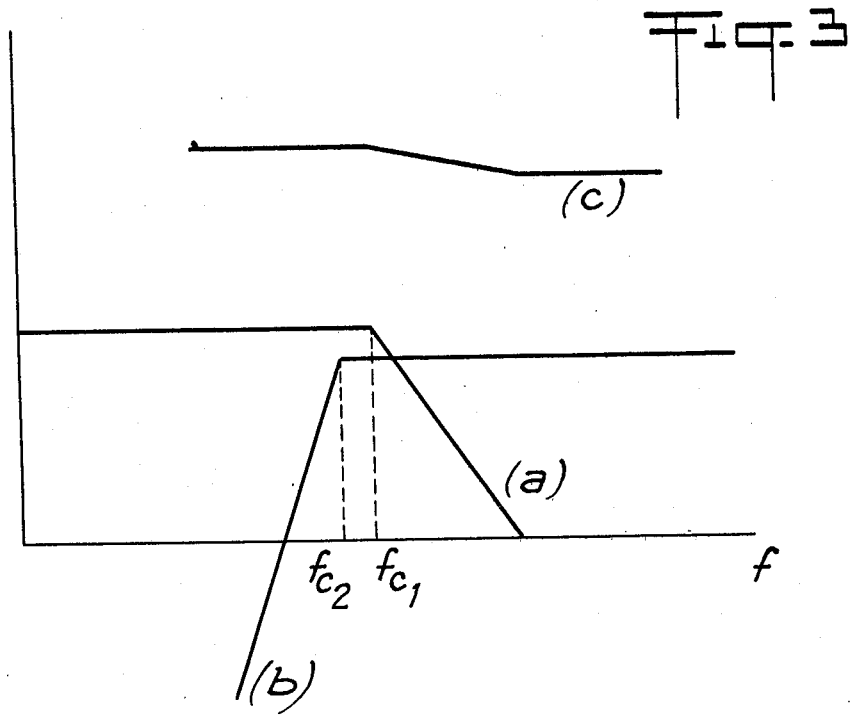
FIG. 3 is a graph representing the stiffness of the magnetic bearing servo-controlled with the circuit of FIG. 2, as a function of the frequency of the disturbances.

FIG. 3 shows the curve c of the stiffness of the bearing servo-controlled by the device of FIG. 2, as a function of the frequency of the disturbances.

The curve a of FIG. 3 represents the stiffness of a bearing servo-controlled with a device in accordance with that of FIG. 1, i.e. with only one conventional negative current feedback loop 2.

The curve b of FIG. 3 represents the stiffness of a bearing servo-controlled with a device of the type of FIG. 2, taking into account only the negative feedback loop 5 from the detection of the variations in magnetic flow.

In the absence of correction intended to take into account the value of the airgap of the servo-controlled bearing, the gain of the servo-control depends on the value $\epsilon$ of this airgap, and the instantaneous force of actuation F is expressed by the following formula:

$$F = KU_c \left(\frac{\epsilon_o}{\epsilon}\right)^2 \quad (1)$$

where $U_c$ is the control voltage of the amplifier 1, $\epsilon_o$ is the mean value of the airgap of the bearing $\epsilon$ is the instantaneous value of the airgap of the bearing, and K is a constant of proportionality.

For low frequencies, lower than the cutoff frequency $fc_1$ of the main servo-control circuit, the conventional negative current feedback loop 2 is sufficient to maintain the value of the gain of the servo-control approximately constant as a function of the frequency of the disturbances (curve a of FIG. 3). However, for frequencies higher than $fc_1$ the stiffness diminishes and the influence of the variations of the width of the airgap is prejudicial to the reliability of the system.

The loop 5 which takes into account the variations of the value of the airgap, by the detection of the derivative of the magnetic flux $\phi$ intervenes precisely for frequencies higher than the cutoff frequency $fc_2$ of the RC network 52, 53 (cf. curve b of FIG. 3).

The cutoff frequencies $fc_1$ and $fc_2$ may be very close to each other, and even equal, frequency $fc_2$ being the lower (for example $fc_1=5$ Hz and $fc_2=1$ Hz). Consequently, when the negative current feedback loop 2 and negative magnetic field feedback loop 5 are used at the same time, as in the case of the device of FIG. 2, the resultant curve c of the stiffness of the bearing as a function of the frequency of the disturbances presents variations reduced to a minimum particularly for the work zone generally situated in the relatively high frequencies, beyond $fc_1$ and $fc_2$.

Figure 4:
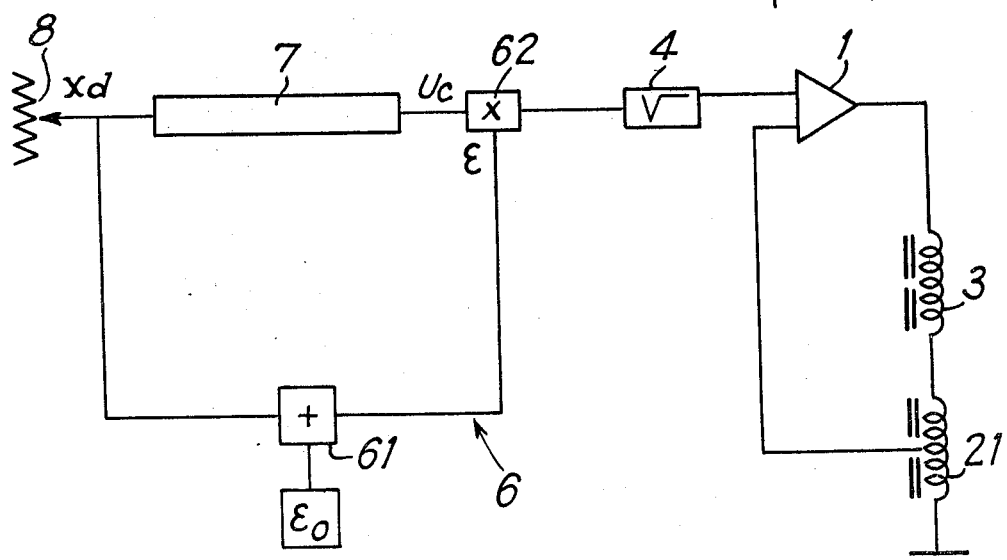
FIG. 4 is a view of a servo-control circuit comprising a gain compensation device according to a second embodiment of the invention.

The device shown in FIG. 4 corresponds to a variant embodiment of the invention. According to this variant, the supplementary electrical means intended to take into account the airgap variations are incorporated upstream of the amplifier 1 and do not act in the form of a feedback loop but from the signals emitted by the detectors detecting the position of the rotor.

Insofar as the detectors are placed in the immediate vicinity of the servo-controlled bearings, the signals $x_d$ representing the variations in the position of the rotor, produced from the signals emitted by the detectors, represent with an excellent precision the variations in the airgap of the servo-controlled bearing. Thus, such a signal $x_d$ is, according to the diagram of the device of FIG. 4, applied to a first input of an adder circuit 61, whilst a signal representing the mean value 20 of the airgap of the servo-controlled bearing is applied to the second input of the adder circuit 61 with double input. The output of the adder circuit 61, which supplies a signal such as $\epsilon d = \epsilon o + x_d$, is applied to an input of a multiplier circuit 62. The second input of the multiplier circuit 62 receives the control voltage $U_c$ formed in a conventional processing circuit 7 from the signals emitted by one or more detectors such as 8. The output of the multiplier circuit 62 is connected to the input of the square root extractor circuit 4. The rest of the device is strictly the same as the device of FIG. 1.

Thus, in the device of FIG. 4, the supplementary electrical means 6 constituted by the adder circuit 61 and multiplier circuit 62 enable a correction of the gain to be permanently effected as a function of the variations in the airgap of the servo-controlled bearing, since the control signal applied to the amplifier 1 is itself permanently corrected with respect to the control voltage $U_c$ obtained in conventional manner. The detectors such as 8 may in particular be detectors of the electromagnetic type.

What is claimed is:

1. In a device for compensating the gain of a circuit for servo-controlling the position of a rotor with the aid of at least one electromagnetic bearing provided with electromagnetic windings, from signals delivered by at least one detector detecting the position of the rotor, the servo-control circuit ensuring the control of the supply of the windings in response to the signals delivered by said at least one detector and comprising an amplification circuit with which is associated a negative current feedback loop, supplementary electrical means are provided for injecting at the input of the amplification circuit a signal depending on the variations in the airgap of the servo-controlled electromagnetic bearing, in a predetermined variation frequency zone.

2. The device of claim 1, wherein said supplementary electrical means comprise an auxiliary coil with a reduced number of turns, disposed near the electromagnet windings of the electromagnetic bearing to deliver a signal proportional to the variation of the flux in the airgap of the electromagnetic bearing, and a first auxiliary integrator circuit to which is applied the signal issuing from the auxiliary coil, the output of said first integrator circuit being connected to the input of the amplification circuit of the servo-control circuit and wherein said negative current feedback loop further comprises a second auxiliary integrator circuit.

3. The device of claim 2, wherein the pass band and the gain of the second auxiliary integrator circuit are respectively equal to the pass band and to the gain of the first auxiliary integrator circuit.

4. The device of claim 2, wherein the time constants of the first and second auxiliary integrator circuits are greater than the time constant of the main servo-control circuit.

5. In a device for compensating the gain of a circuit for servo-controlling the position of a rotor with the aid of at least one electromagnetic bearing provided with electromagnet windings, from signals delivered by at least one detector detecting the position of the rotor, the servo-control circuit ensuring the control of the supply of the windings in response to the signals delivered by said at least one detector and comprising an amplification circuit with which is associated a negative current feedback loop, supplementary electrical means are provided for injecting at the input of the amplification circuit a signal depending on the variations in the airgap of the servo-controlled electromagnetic bearing, in a predetermined variation frequency zone, said supplementary electrical means having an adder circuit with two inputs to which are applied on the one hand a signal obtained from said detectors and representing the variations in the position of the rotor and on the other hand a signal corresponding to the mean position of the rotor, and a multiplier circuit mounted upstream of the amplification circuit provided with its negative current feedback loop, to effect the product of the control signal of the non-corrected amplification circuit and of the signal of said adder circuit.

6. The device of claim 5, wherein the signal representing the variation in the position of the rotor is obtained from a detector of electromagnetic type.

* * * * *